United States Patent
Matsuyama et al.

(10) Patent No.: US 8,876,397 B2
(45) Date of Patent: Nov. 4, 2014

(54) LIQUID LUBRICATING TAPERED ROLLER BEARING DEVICE

(75) Inventors: Hiroki Matsuyama, Osaka (JP); Kazutoshi Toda, Tondabayashi (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 1561 days.

(21) Appl. No.: 11/598,740

(22) Filed: Nov. 14, 2006

(65) Prior Publication Data

US 2007/0133917 A1    Jun. 14, 2007

(30) Foreign Application Priority Data

Nov. 15, 2005  (JP) ................................ 2005-330148

(51) Int. Cl.
| | |
|---|---|
| F16C 33/46 | (2006.01) |
| F16C 33/58 | (2006.01) |
| F16C 19/36 | (2006.01) |
| F16C 33/66 | (2006.01) |
| F16C 33/54 | (2006.01) |

(52) U.S. Cl.
CPC ............ *F16C 33/6674* (2013.01); *F16C 33/58* (2013.01); *F16C 19/364* (2013.01); *F16C 2240/40* (2013.01); *F16C 33/543* (2013.01)
USPC .......................................... 384/571; 384/572

(58) Field of Classification Search
USPC .......................................... 384/470, 571, 572
IPC ...................................................... F16C 19/36
See application file for complete search history.

(56) References Cited

U.S. PATENT DOCUMENTS

| | | | | |
|---|---|---|---|---|
| 6,086,261 | A * | 7/2000 | Nakagawa et al. | 384/571 |
| 2005/0213861 | A1* | 9/2005 | Ono et al. | 384/571 |
| 2007/0133914 | A1* | 6/2007 | Matsuyama et al. | 384/470 |
| 2007/0230851 | A1 | 10/2007 | Matsuyama et al. | |

FOREIGN PATENT DOCUMENTS

| | | |
|---|---|---|
| EP | 1 580 028 A2 | 9/2005 |
| FR | 2 548 297 | 1/1985 |
| JP | 7-144548 | 6/1995 |
| JP | 10-89352 | 4/1998 |
| JP | 10-89353 | 4/1998 |
| JP | 11-48805 | 2/1999 |

(Continued)

OTHER PUBLICATIONS

European Search Report dated Feb. 10, 2010.

(Continued)

*Primary Examiner* — Phillip A Johnson
(74) *Attorney, Agent, or Firm* — McGinn IP Law Group, PLLC

(57) ABSTRACT

A liquid lubricating tapered roller bearing device, includes: an outer ring; an inner ring including an outer end surface at a smaller diameter side; tapered rollers; and a cage located further inside in an axial direction than the outer end surface of the inner ring and including an end portion at a smaller diameter side, the end portion defining an outer end surface and an inner periphery. Inequalities $X2/B \geq 0.010$ and $0.009 \leq X1/D \leq 0.043$ are satisfied where B represents a width in the axial direction of the inner ring; D represents a bore diameter of the inner ring; X2 represents a distance in the axial direction from the outer end surface of the inner ring to the outer end surface of the case; and X1 represents a dimension of a clearance in a diameter direction between the inner periphery of the cage and the inner ring.

17 Claims, 8 Drawing Sheets

(56) References Cited

FOREIGN PATENT DOCUMENTS

| | | |
|---|---|---|
| JP | 11-325087 | 11/1999 |
| JP | 2000-220647 | 8/2000 |
| JP | 2003-343552 | 12/2003 |
| JP | 2005-69421 | 3/2005 |
| JP | 2005-069421 A | 3/2005 |
| JP | 2005069421 A * | 3/2005 ............. F16C 19/36 |
| WO | 2005/045269 | 5/2005 |
| WO | 2005/100809 | 10/2005 |

OTHER PUBLICATIONS

Japanese Office Action dated Jul. 27, 2010 (with English translation).

* cited by examiner

LIQUID LUBRICATING TAPERED ROLLER BEARING DEVICE

BACKGROUND OF THE INVENTION

The present invention relates to a liquid lubricating tapered roller bearing device having an inner ring, an outer ring, a tapered roller and a cage, in which liquid flows into the gap between the inner ring and the outer ring from one side in an axis direction to the other side in the axis direction, and more particularly, to a liquid lubricating tapered roller bearing device that is used to rotatably support a pinion shaft of a vehicle pinion shaft support device having a pinion shaft, such as a deferential gear device, a transaxle device, or a transfer device.

In the related art, a liquid lubricating tapered roller bearing device rotatably supports a pinion shaft of a differential gear device. The liquid lubricating tapered roller bearing device includes an inner ring, an outer ring, and a tapered roller, and the inner periphery of the inner ring is fitted and fixed to the exterior of the pinion shaft of the differential gear device, while the outer periphery of the outer ring is fitted and fixed the interior of a housing of the differential gear device.

In the liquid lubricating tapered roller bearing device, oil flowing in through a liquid path from a ring gear of a differential gear device flows and lubricates from an opening at one side in the axis direction to the other opening, between the inner periphery of the outer ring and the outer periphery of the inner ring, thus preventing seizure from occurring in the outer ring, the inner ring and the tapered roller.

However, in the liquid lubricating tapered roller bearing device, while it is possible to prevent seizure from occurring in the outer ring, the inner ring and the tapered roller by the circulation of oil, the oil flows between the inner ring and the outer ring from one side in the axis direction to the other side in the axis direction, and the oil is appropriate for preventing seizure in coupled portions of various gears such as a ring gear or a side gear and has a higher viscosity than oil for lubricating a bearing. Therefore, problems are found in that agitation loss of the tapered roller bearing device increases and a rotation torque of the liquid lubricating tapered roller bearing device is unavoidably increased. In this respect, there is a demand for a liquid lubricating tapered roller bearing device capable of reducing a rotation torque and improving fuel efficiency of the liquid lubricating tapered roller bearing device for the vehicle and the like, even though oil with high viscosity flows into the bearing device.
Patent Document 1: JP-A-11-48805

SUMMARY OF THE INVENTION

The present invention has been made in view of the drawbacks inherent in the related art, and accordingly, an object of the present invention is to provide a liquid lubricating tapered roller bearing device in which a agitation loss and a rotating torque are small.

In order to solve the above problem, the present invention is characterized by having the following arrangement.
(1) A liquid lubricating tapered roller bearing device comprising:
   an outer ring;
   an inner ring;
   tapered rollers disposed between the outer and inner rings;
   a cage that holds the tapered rollers;
   wherein the inner ring includes a raceway surface on which the tapered rollers are disposed, and a small-diameter end portion and a large-diameter end portion which are formed at opposite ends of the raceway surface,
   wherein the cage includes a large-diameter end portion located corresponding to the large-diameter end portion of the inner ring and a small-diameter end portion located corresponding to the small-diameter end portion of the inner ring,
   wherein the small-diameter end portion of the cage includes a bending portion facing an outer periphery of the small-diameter end portion of the inner ring with a clearance,
   wherein an axial outer end surface of the bending portion is located further inside in an axial direction that an axial outer end surface of the small-diameter end portion of the inner ring,
   wherein liquid lubricates between the inner ring and the outer ring, and
   wherein inequalities $X2/B \geq 0.010$ and $0.009 \leq X1/D \leq 0.043$ are satisfied where:
   B represents a width in the axial direction of the inner ring;
   D represents a bore diameter of the inner ring;
   X2 represents a distance in the axial direction from the axial outer end surface of the inner ring to the axial outer end surface of the bending portion; and
   X1 represents a dimension of a clearance in a diameter direction between the bending portion and the small-diameter end portion of the inner ring.
(2) The liquid lubricating tapered roller bearing device according to (1), wherein
   the small-diameter end portion of the inner ring includes a small rib portion and a cylindrical portion,
   the small rib portion includes an outside diameter larger than an outside diameter of the cylindrical portion,
   an inner periphery of the bending portion is located further inside in the diameter direction than the small rib portion,
   inequalities $0.010 \leq X2/B \leq 0.161$, $0.006 \leq X3/D \leq 0.043$, or $0.009 \leq X4/B \leq 0.053$ are satisfied where:
   X3 represents a distance in the diameter direction from an outer periphery of the small rib portion to the inner periphery of the bending portion; and
   X4 represents a dimension of a clearance between an axial outer end surface of the small rib portion and an axial inner end surface of the bending portion.
(3) The liquid lubricating tapered roller bearing device according to (1), wherein in a section including a central axis of the outer ring, an angle at which a tapered raceway surface of the outer ring crosses the central axis is set to the range of 25 to 30°.

Throughout this specifications, in the case of setting the distance, length or dimension, the minimum distance, length, or dimension are indicated. For example, the distance in the axis direction from the axial outer end surface of the small-diameter end portion of the inner ring to an axial outer end surface of the bending portion of the cage means the minimum distance in the axis direction.

The inventor has studied the effects of the X1 the X2 on a rotation torque of the outer ring. As a result, it is found that when X2/B is set to 0.010 or more, torque can be significantly decreased; on the other hand, when X2/B is set to 0.010 or less, torque hardly decreases. In addition, it is found that when X2/B is set to 0.010 or more and the inequality $0.009 \leq X1/D \leq 0.043$ is satisfied, torque correlated with agitation loss of liquid (oil, cleaning fluid, etc.) flowing inside the bearing device can be reduced to 80% or torque of the related art. Further, it is found that if the inequality X1/D<0.009 is set, during driving the tapered roller bearing device, the end portion at the smaller diameter side of the cage (the bending portion of the cage) interferes with the inner ring; on the other hand, if the inequality $X1/D>0.043$ is set, torque is rarely reduced. However, even though the inequality $X1/D>0.043$ is set, in the case of $X1/D\leq0.071$, torque can be reduced by 10% or more, as compared to the tapered roller bearing device according to the related art.

According to the invention, if $X2/B$ is 0.010 or more, the inequality $0.009\leq X1/D\leq0.043$ is satisfied, during driving the liquid lubricating tapered roller bearing device, torque can be significantly reduced, and it is reliably prevented that an end portion at the smaller diameter side of the cage (the bending portion of the cage) interferes with the inner ring. Therefore, the liquid lubricating tapered roller bearing device of the invention can improve fuel efficiency of a vehicle or the like, and prevents problems due to the overlapping.

The inventor has conducted an experiment to compare the torque ratio and the amount ratio of penetrating oil in the casing of providing a labyrinth structure between the cage and the small rib portion of the inner ring with respect to the torque ratio and the amount ratio of penetrating oil according to the related art in which the labyrinth structure is not provided. Here, the labyrinth structure means a structure in which an outside diameter of the small-diameter end of the cylindrical portion of the inner ring in the axis direction is smaller than the outside diameter of the small rib portion of the inner ring, and an end portion at the smaller diameter side of the cage (the bending portion) is located in the axis direction between the outer end surface of the inner ring and the small rib portion (between the axial outer end surface of the small-diameter end portion of the inner ring and the axial outer end surface of the small rib portion of the inner ring), and the inner periphery at the smaller diameter side of the cage (the inner periphery of the bending portion) is located inside in the diameter direction of the outer periphery of the small rib portion. To be more specific, when $X1/D$ is fixed to 0.021, and $X3/D$ is modified in the range of −0.023 to 0.043 (as for $X3$, refer to FIG. 2, when the inner periphery at the smaller diameter side of the cage is located outside in the diameter direction of the small rib portion of the inner ring, $X3$ is negative), the toque ratio and the amount ratio of penetrating oil are compared with respect to the torque ratio and the amount ratio of penetrating oil according to the related art. If the value of $X3/D$ is negative, the inner periphery at the smaller diameter side of the cage (the inner periphery of the bending portion) is located further outside in the diameter direction than the small rib portion of the inner ring, so that the inner periphery is located out of the labyrinth. As a result, it is found that the torque ratio according to the related art is almost independent of $X3/D$, and the amount ratio of penetrating oil according to the related art becomes the smallest when $X3/D$ is −0.023, and the amount ratio of penetrating oil becomes around 1 when $X2/D$ is 0.006 or more, which means the amount of penetrating oil of the invention is similar to that of the related art. If torque reduces constantly, temperature rise of the bearing is better controlled where the amount of penetrating oil is larger, thus preventing seizure. Therefore, the labyrinth structure in which $X1/D$ is set to the range of 0.009 to 0.043, and $X3/D$ is set to the range of 0.006 to 0.043 is applied between the cage and the small rib portion of the inner ring, which helps reduce torque and prevent seizure. Here, if $X3/D$ becomes 0.043 or more, assembly efficiency of the bearing deteriorates. In addition, according to the experiment, even though $X4/B$ is modified in the range of 0.009 to 0.053, torque does not change. The inventor compares torque with respect to torque of the related art, when $X1/D$ is fixed to 0.021, and $X2/B$ is modified in the range of −0.069 to 0.161. As a result, as the value of $X2/B$ increases up to 0.01, the value of torque ratio monotonically decreases. In the meantime, when the value of $X2/B$ increases from 0.01 to 0.161, the value of torque ratio becomes constant.

According to the invention, inequalities $0.010\leq X2/B\leq0.161$, $0.006\leq X3/D\leq0.043$, and $0.009\leq X4/B\leq0.053$ are satisfied, thus, significantly reducing torque and preventing seizure, as compared to the related art.

When an angle at which the tapered raceway surface of the outer ring crosses the central axis is modified in the section including the central axis of the outer ring, the inventor compares the torque ratio and the amount ratio of penetrating oil with respect to the torque ratio and the amount ratio of penetrating oil according to the related art. As a result, it is found that when the angle at which the surface crosses the central axis is set to the range of 25 to 30°, it is possible to increase the torque ratio and the amount of penetrating oil, so that driving costs of the bearing device can be reduced and seizure is prevented from occurring in the bearing device.

According to the invention, in the section including the central axis of the outer ring, the tapered raceway surface of the outer ring crosses the central axis at the angle in the range of 25 to 30°. Therefore, a pumping function can be advanced to discharge the liquid to the outside of the bearing device, thus reducing torque and preventing seizure.

According to the invention, in the liquid lubricating tapered roller bearing device, since $X2/B$ is 0.010 or more, and the inequality $0.009\leq X1/D\leq0.043$ is satisfied, toque can be significantly receded during driving the tapered roller bearing device, thus reducing driving costs of a vehicle or the like having the liquid lubricating tapered roller bearing device of the invention.

DETAILED DESCRIPTION OF PREFERRED EMBODIMENTS

Hereinafter, the invention will be described in detail with reference to the accompanying drawings.

Figure 1:
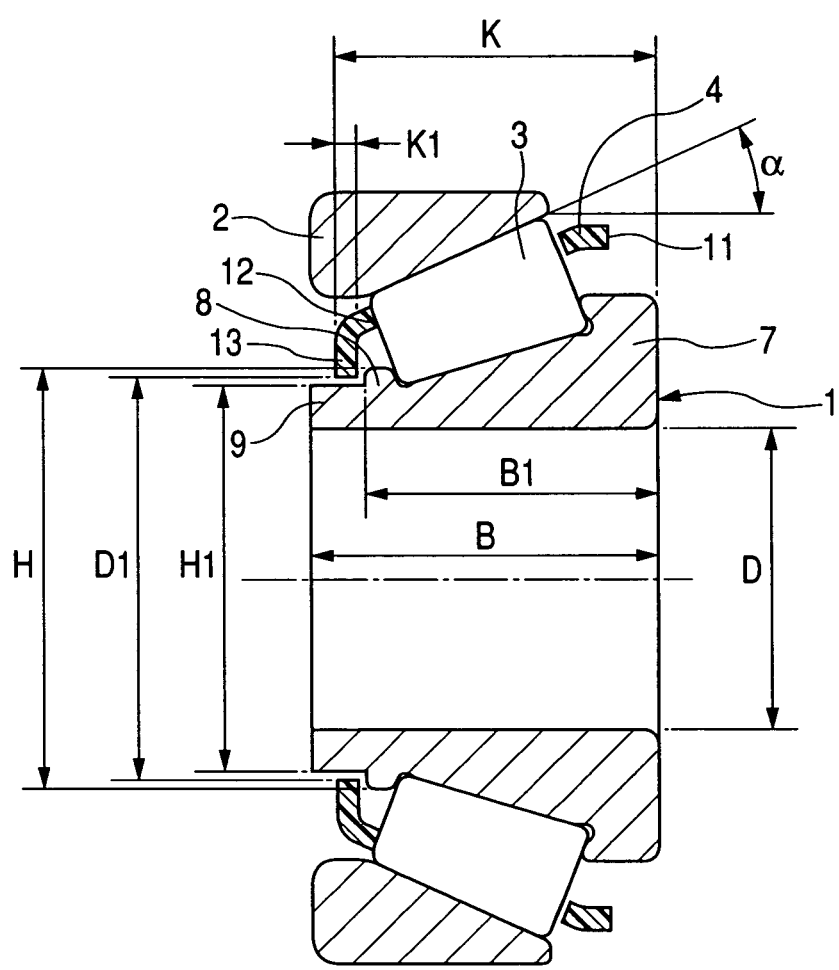
FIG. 1 is an axial cross-sectional view illustrating a liquid lubricating tapered roller bearing device according to a first embodiment of the present invention.
Figure 2:
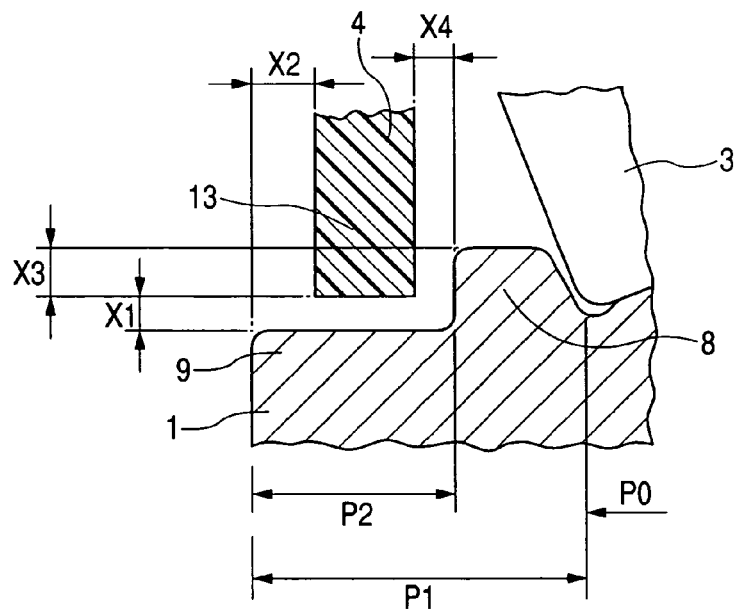
FIG. 2 is an exploded cross-sectional view illustrating a portion in the vicinity of a small-diameter end portion (cylindrical portion) of a cage of the liquid lubricating tapered roller bearing device.

FIG. 1 is an axial cross-sectional view illustrating a liquid lubricating tapered roller bearing device according to a first embodiment of the present invention. FIG. 2 is an exploded cross-sectional view illustrating a portion in the vicinity of a bending portion of a cage of the liquid lubricating tapered roller bearing device.

The liquid lubricating tapered roller bearing device (hereinafter, referred to as "tapered roller bearing device") includes an inner ring 1, an outer ring 2, tapered rollers 3 disposed between the inner ring 1 and the outer ring 2, and a cage 4 for holding the tapered rollers.

The inner ring 1 includes a tapered raceway surface 5 on which the tapered rollers 3 are disposed, a small-diameter end portion 6 provided at a left end portion of the raceway surface 5 and a large-diameter end portion 7 provided at a right end portion of the raceway surface 5. The small-diameter end portion 6 of the inner ring 1 includes a small rib portion 8 for restricting movement of the tapered rollers 3 in the axial direction and a cylindrical portion 9 which have a diameter smaller than that of the small rib portion 8 and communicates with an axial outer side of the small rib portion 8. The large-diameter end portion 7 of the inner ring 1 includes a large rib portion for restricting the movement of the tapered rollers 3 in the axial direction.

The outer ring 2 includes a tapered raceway surface 10 on which the tapered rollers 3 are disposed.

The cage 4 includes a large diameter end portion 11 projecting from the tapered rollers 3 in a right side, and a small diameter end portion 12 projecting from the tapered rollers 3 in a left side. The small diameter end portion 12 of the cage 4 includes a bending portion 13 bent inwardly in a diameter direction. The bending portion 13 faces an outer periphery of the cylindrical portion 9 of the small-diameter end portion 6 of the inner ring 1 with a clearance.

The tapered roller bearing device is disposed on a pinion shaft of a differential gear device (not shown). To be more specific, the inner periphery of the inner ring 1 is fixed by outside-fitting with the pinion shaft of the differential gear device, while the outer periphery of the outer ring 2 is fixed by inside-fitting with a housing in the differential gear device. Oil (as an example of liquid) flowing in from a ring gear of the differential gear device is introduced in between the inner ring 1 and the outer ring 2 at the smaller diameter side of the tapered raceway surface 5 of the inner ring 1, and flows out between the inner ring 1 and the outer ring 2 at the larger diameter side of the tapered raceway surface 5 of the inner ring 1. The inflow and outflow are generated by the flow caused by pumping operation of the bearing and, if necessary, a coercive flow caused by an external operation outside the bearing.

In FIG. 1, D (mm) indicates a bore diameter of the inner ring 1, B (mm) indicates the width of the inner ring 1, H (mm) indicates an outside diameter of the small rib portion 8 of the inner ring 1, α (°) indicates an angle (hereinafter, referred to as 'angle of the outer ring raceway') at which the tapered raceway surface 10 of the outer ring 2 crosses the central axis in the section including the central axis of the outer ring 2. In addition, D1 (mm) indicates a minimum bore diameter of the bending portion 13 of the cage 4, and K (mm) indicates a distance from an axial outer end surface of the large-diameter end portion 7 of the inner ring 1 to an axial outer end surface of the bending portion 13 of the cage 4 in a state that the cage 4 has ultimately moved to the large rib portion of the inner ring 1. H1 (mm) indicates an outside diameter of the cylindrical portion 9 of the inner ring 1.

In FIG. 2, X1 (mm) indicates a clearance in a diameter direction between an inner periphery of the bending portion 13 of the cage 4 and the cylindrical portion 9 of the inner ring 1, X2 (mm) indicates the length from the axial outer end surface of the cylindrical portion 9 of the inner ring 1 to the axial outer end surface of the bending portion 13 of the cage 4 (here, when the axial outer end surface of the cylindrical portion 9 of the inner ring 1 is located further outside in the axis direction than the axial outer end surface of the bending portion 13 of the cage 4, X2 is positive, when vice versa X2 is negative). In addition, X3 (mm) indicates a length from the outer periphery of the small rib portion 8 of the inner ring 1 to the inner periphery of the bending portion 13 of the cage 4 (here, when the outer periphery of the small rib portion 8 of the inner ring 1 is located further outside in the diameter direction than the inner periphery of the bending portion 13 of the cage 4, X3 is positive, and when vise versa, X3 is negative). In other words, X3 (mm) indicates an overlapped amount of the bending portion 13 of the cage 4 with respect to the small rib portion 8 of the inner ring 1 (an overlapped region in the diameter direction). X4 (mm) indicates a distance between the axial outer end surface of the small rib portion 8 of the inner ring 1 and the axial inner end surface of the bending portion 13 of the cage 4, K1 (mm) indicates a thickness in the axis direction of the bending portion 13 of the cage 4, and B1 (mm) indicates a distance between the axial outer end surface at the large diameter end portion of the inner ring 1 and the axial outer end surface of the small rib portion 8 of the inner ring 1.

The relationship among X1, D1 and H1 agrees with the equation X1=(D1−H1)/2, the relationship among X2, B and K agrees with the equation X2=B−K, and the relationship among X4, K, K1, and B1 agrees with the equation X4=K−K1−B1. Table 1 arranges the above-described relationships.

TABLE 1

| | |
|---|---|
| D | A bore diameter of the inner ring (a bore diameter of the bearing) |
| B | A width of the inner ring in an axial direction |
| H | An outside diameter of the small rib portion of the inner ring |

TABLE 1-continued

| | |
|---|---|
| H1 | An outside diameter of a cylindrical portion of the inner ring |
| D1 | A bore diameter of the bending portion of the cage |
| K | A distance from an axial outer end surface of the large-diameter end portion of the inner ring to an axial outer end surface of the bending portion of the cage in a state that the cage has ultimately moved to the large rib portion of the inner ring. (A minimum distance from the axial outer end surface of the large-diameter end portion of the inner ring to the axial outer end portion of the bending portion) |
| X1 | A clearance in the diameter direction between the cage and the cylindrical portion of the inner ring (A clearance between the inner periphery of the bending portion of the cage and the outer periphery of the cylindrical portion of the inner ring) X1 = (D1 − H1)/2 |
| X2 | A projecting amount of the cylindrical portion of the inner ring with respect to the cage (A distance from the axial outer end surface of the small diameter end portion (cylindrical portion) of the inner ring to the axial outer end portion of the bending portion of the cage) X2 = B − K |
| X3 | An overlapped amount of the bending portion of the cage with respect to the small rib portion of the inner ring (a length in the diameter direction from the outer periphery of the small rib portion of the inner ring to the inner periphery of the bending portion of the cage) X3 = (H − D1)/2 |
| X4 | A clearance in the axis direction between the small rib portion of the inner ring and the bending of the cage (a distance between the axial outer end surface of the small rib portion of the inner ring and the axial outer end surface of the bending portion of the cage) X4 = K − K1 − B1 |
| α | An angle of the outer ring raceway |

As shown in FIG. 1, in the tapered roller bearing device, the outside diameter of the small rib portion of the inner ring 1 is larger than the outside diameter of the cylindrical portion 9 of the inner ring 1. To be more specific, according to a first embodiment, X2/B is set in the range of X2/B≥0.010, X1/D is in the range of 0.009≤X1/D≤0.043. In addition, X2/B is set in the range of 0.010≤X2/B≤0.161, X3/D is set in the range of 0.006≤X3/D≤0.043, X4/B is set in the range of 0.009≤X4/B≤0.053. The angle α of the outer ring raceway is set in the range of 25≤α≤30°. When z indicates the number of tapered rollers, DW (mm) indicates an average diameter of the tapered roller ({(diameter of the end surface at the larger diameter of the tapered roller)+(diameter of the end surface at the smaller diameter side of the tapered roller)}/2 (mm)), and dm indicates a diameter (mm) of a pitch circle which is defined by a circle diameter of the raceway that is drawn by the center point of the tapered roller, z·DW/(Π·dm) indicating the filling rate of the tapered roller is set in the range of 0.7 to 0.92. If the filling rate of the tapered roller is set above 0.7, dealing with load is ensured, and rigidity required for the pinion shaft is ensured, thus preferably preventing serious vibration. On the other hand, if the filling rate of the tapered roller is set below 0.92, it is possible to reduce agitation loss of the tapered roller, and to increase the amount of oil flowing inside the bearing device to the fullest, thus preferably deterring seizure.

The inventor conducted experiments to find out how the torque value changes when the above-defined factors which define the shape of the tapered roller bearing device are modified using various methods.

Figure 3:
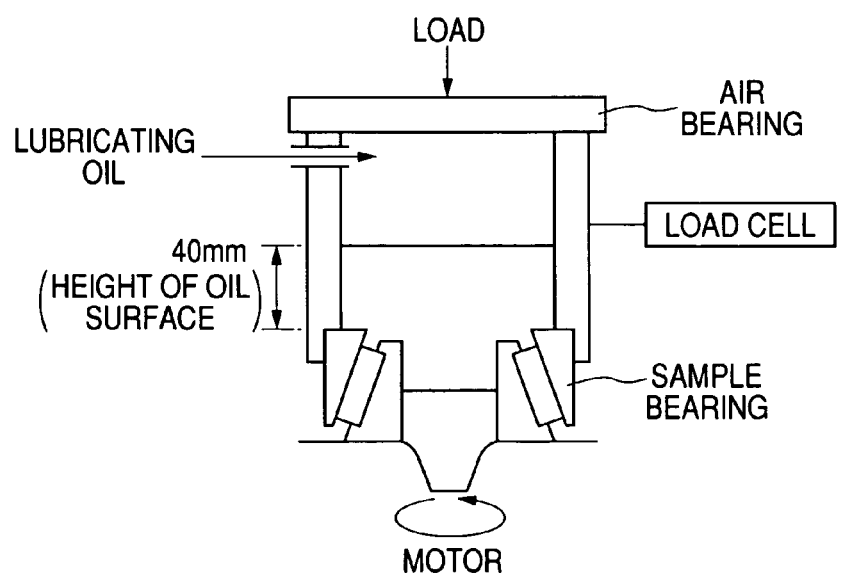
FIG. 3 is a cross-sectional view schematically illustrating a tester which is used to examine a rotating torque of a sample bearing or a value of the amount of penetrating oil.

FIG. 3 is a cross-sectional view schematically illustrating a tester which is used in the experiment.

The tester is a longitudinal torque measure device. As shown in FIG. 3, the longitudinal torque measures device is designed do rotate the inner ring of the tapered roller bearing device used in the experiment (in FIG. 3, sample bearing). The longitudinal torque measure device fixes the rear side of the outer ring of the sample bearing (the axial outer end surface of the small-diameter end portion of the outer ring) to face upward. Conditions for experiments are illustrated in Table 2 below.

TABLE 2

| | |
|---|---|
| Axial load | 4 kN |
| Rotation speed of inner ring | 3000 r/min |
| Lubricating oil | Gear oil (SAE85W-90) |
| Temperature of supply oil | 50° C. |
| Amount of oil supply | The surface of oil is kept in a position 40 mm higher than the rear side of the outer ring (the surface of oil is 40 mm high from the top surface of the bearing), the amount of oil is in a full amount of oil condition |

In addition, the experiments are conducted by the following methods using the tester.

1) Lubricating the sample bearing is performed by supplying a lubricating oil to the sample bearing from the rear side of the outer ring, and the oil penetrating the sample bearing returns to a supply tank to circulate. The temperature of supply oil is measured at an outlet of a supply nozzle, and is controlled in the supply tank to be constant.

2) When measuring toque, the amount of oil supply is controlled such that the surface of oil is kept in a position 40 mm higher than the rear side of the outer ring. In this case, the amount of oil supply per a unit time, that is, the amount of oil penetrating the bearing is measured by a flowmeter. In addition, the temperature of the sample bearing is measured at an outside diameter surface of the outer ring, and the difference between the temperature of the bearing and the temperature of the oil supply means the temperature rise of the bearing.

3) While an axial load is applied to the sample bearing, the inner ring is rotated by a predetermined rotation speed, and the torque applied to an outer ring supported by a static pressure air bearing is measured by a load cell. In addition, measurement is performed three times in each sample bearing, and an average of the measurement is a measure value.

Figure 4:
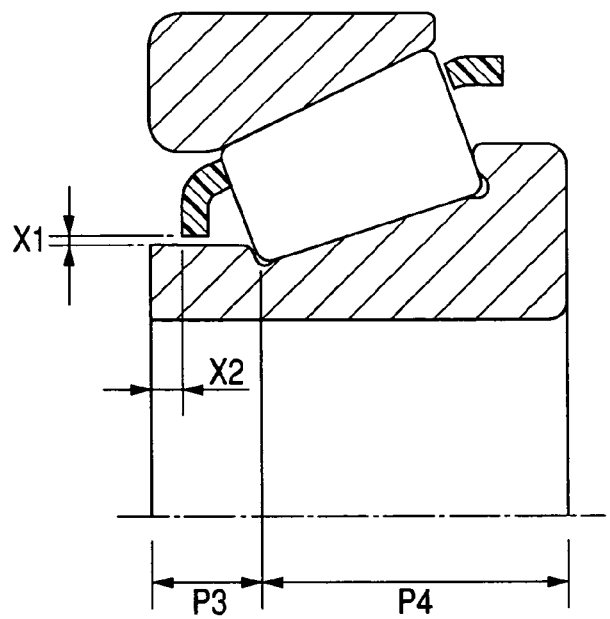
FIG. 4 is an axial cross-sectional view illustrating the sample bearing which is used in variation experiments of a rotating torque.
Figure 5:
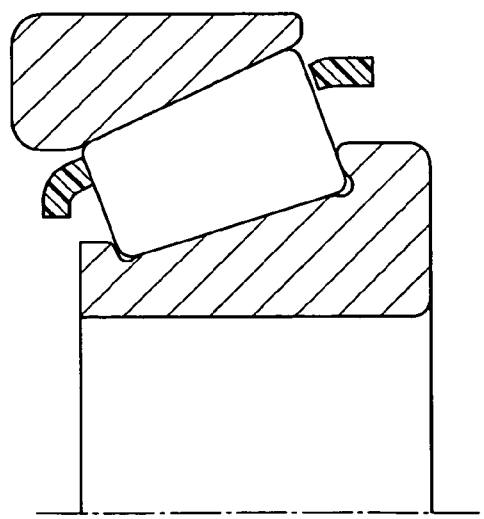
FIG. 5 is an axial cross-sectional view illustrating a conventional bearing in calculating the torque ratio and the quantity ratio of penetrating oil.
Figure 6:
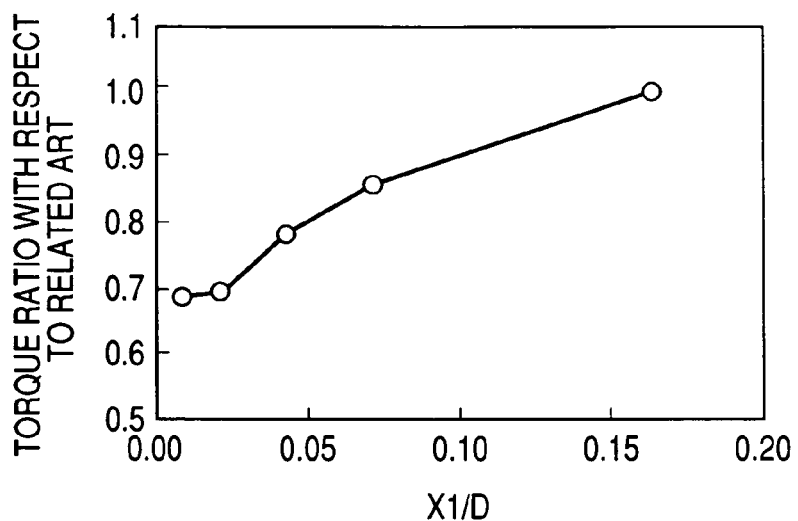
FIG. 6 is a view illustrating variation of torque ratio according to the related art when $X1/D$ is modified in the sample bearing.

Table 3 indicates an experiment of a torque ratio of the sample bearing with respect to the tapered roller bearing device according to the related art, in the sample bearing (sample tapered roller bearing) of the axial cross-sectional view of FIG. 4, when the value of X1/D is modified. FIG. 5 is an axial cross-sectional view illustrating the according to the tapered roller bearing the related art. In addition, FIG. 6 is a graph illustrating results of Table 3. In FIG. 4, the small rib portion (small diameter end portion) of the inner ring shown by P3 is formed of a ring-shaped member and is integrally formed with a main body including the large diameter end portion of the inner ring formed of a ring-shaped member shown by P4. However, the small rib portion P3 of the inner ring and the main body P4 may be formed separately and the small rib portion P3 may contact the main body P4 in the axial direction.

TABLE 3

| | X1 (mm) | | | | | |
|---|---|---|---|---|---|---|
| | 0.30 | 0.75 | 1.50 | 2.50 | 5.75 | |
| | | | X1/D | | | Related |
| | 0.009 | 0.021 | 0.043 | 0.071 | 0.164 | art |
| Torque (N·m) | 0.89 | 0.90 | 1.02 | 1.11 | 1.30 | 1.30 |
| Torque ratio | 0.68 | 0.69 | 0.78 | 0.85 | 1.00 | 1.00 |

As shown in FIG. 4, in the sample bearing that is used in the experiment for variation of X1/D, since the outside diameter of the small rib portion P3 forming the small diameter end portion of the inner ring is equal to the outside diameter of the cylindrical portion, a step does not exist between the small rib portion and the end portion. In addition, as shown in FIG. 5, in the bearing according to the related art, the axial outer end surface of the small diameter end portion of the inner ring is located further inside in the axis direction than the bending portion of the cage. In addition, when experiment is performed for variation of X1/D, X2/B is fixed to 0.090. In addition, as the bearing according to the related art, X1/D is set to 0.066 and X2/B is set to −0.069.

As shown in Table 3 and FIG. 6, in this experiment, as X1/D decreases, the torque ratio according to the related art monotonically decreases. More particularly, if X1/D becomes less than 0.043, torque sharply decreases to below 80% of the torque according to the related art. In this respect, if X1/D is set to below 0.043, torque can be sharply reduced, as compared to the related art.

Figure 7:
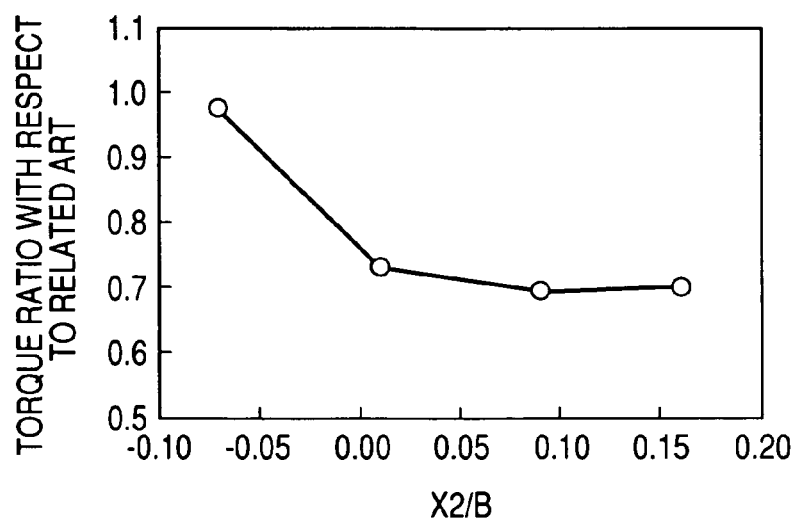
FIG. 7 is a view illustrating variation of torque ratio according to the related art, when $X2/B$ is modified in the sample bearing of FIG. 4.

Table 4 illustrates an exemplary experiment of torque according to the related art in the sample bearing of the axial cross-sectional view of FIG. 4, when the value of X2/B is modified. FIG. 7 illustrates a graph resulting from Table 4. In addition, when an experiment is conducted to modify X2/B, as a bearing according to the related art, the bearing (X1/D is 0.066, and X2/B is −0.069) is used. Further, X1/D is fixed to 0.021.

TABLE 4

| | X2 (mm) | | | | |
|---|---|---|---|---|---|
| | −2.63 | 0.37 | 3.42 | 6.11 | |
| | | X2/B | | | Related |
| | −0.069 | 0.010 | 0.090 | 0.161 | art |
| torque (N·m) | 1.27 | 0.95 | 0.90 | 0.91 | 1.30 |
| Torque ratio | 0.98 | 0.73 | 0.69 | 0.70 | 1.00 |

As shown in Table 4 and FIG. 7, as X2/B increases from −0.069 to 0.010, the torque ratio according to the related art monotonically decreases. Meanwhile, if X2/B becomes 0.010 or more, the value of the torque ratio becomes constant. In this respect, if X2/B is set to 0.010 or more, the value of torque can be set in the range of the minimum value.

Figure 8:
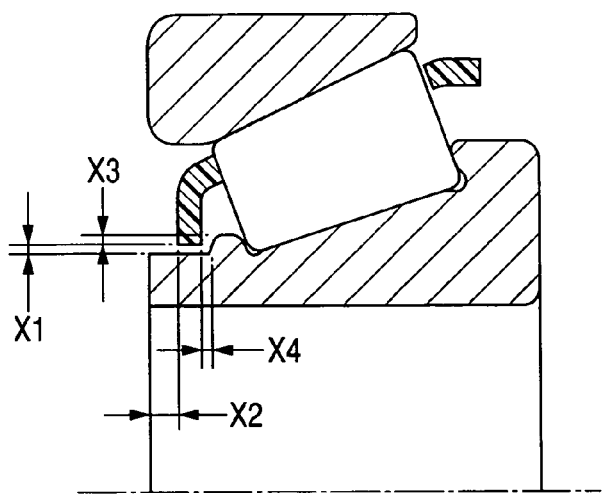
FIG. 8 is an axial cross-sectional view illustrating a sample bearing used in experiments for variation rotation torque or variation of penetrating oil quantity.
Figure 9:
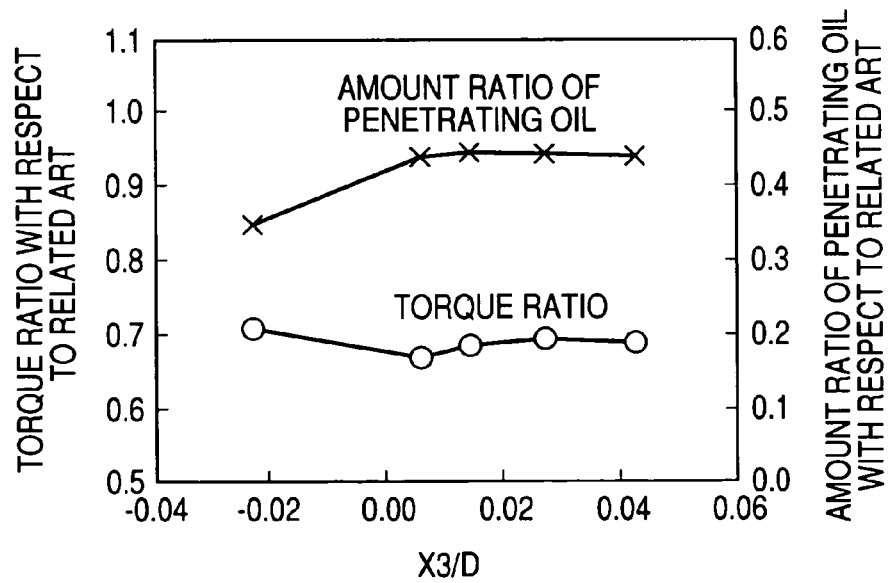
FIG. 9 is a view illustrating variation of torque ratio according to the related art, when $X3/D$ is modified in the sample bearing of FIG. 8.

Table 5 illustrates an exemplary experiment of the torque ratio with respect to the related art and the amount ratio of penetrating oil that is defined by the amount of oil penetrating the sample bearing with respect to the amount of oil penetrating the bearing according to the related art, in the sample bearing in the axial cross-sectional view of FIG. 8, when X3/D is modified in the range of −0.023 to 0.043 while X1/D is fixed to 0.021, X2/B is fixed to 0.090, and X4/B is fixed to 0.014. FIG. 9 is a graph resulting from Table 5.

TABLE 5

| | X3 (mm) | | | | | |
|---|---|---|---|---|---|---|
| | −0.80 | 0.20 | 0.50 | 0.95 | 1.50 | |
| | | | X3/D | | | Related |
| | −0.023 | 0.006 | 0.014 | 0.027 | 0.043 | art |
| torque (N·m) | 0.92 | 0.87 | 0.89 | 0.90 | 0.90 | 1.30 |
| Torque ratio | 0.71 | 0.67 | 0.68 | 0.69 | 0.69 | 1.00 |
| Amount of penetrating oil (L/min) | 3.65 | 4.60 | 4.67 | 4.66 | 4.63 | 10.59 |
| Amount ratio of penetrating oil | 0.34 | 0.43 | 0.44 | 0.44 | 0.44 | 1.00 |

As shown in Table 5 and FIG. 9, as the value of X3/D increases from −0.023 to 0.006, the value of torque ratio slightly decreases, and the value of the amount ratio of penetrating oil monotonically increases. Further, as the value of X3/D increases from 0.006 to 0.043, the value of torque ratio and the value of the amount ratio of penetrating oil all become constant. In this respect, if the value of X3/D is set to the range of from 0.006 to 0.043, the value of torque can be controlled, and the amount of oil penetrating the bearing can be kept in the maximum. Therefore, it is possible to control torque and prevent seizure.

Figure 10:
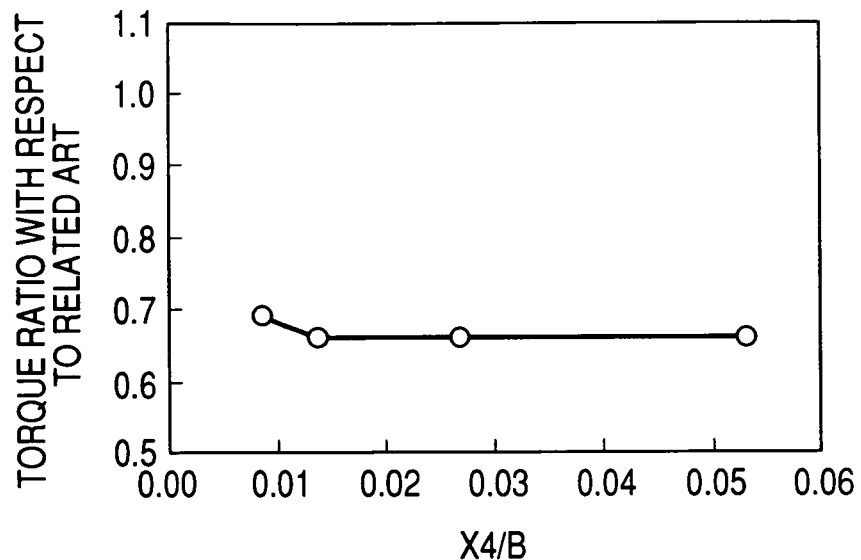
FIG. 10 is a view illustrating variation of torque ratio according to the related art, when $X4/B$ is modified in the sample bearing of FIG. 9.

Table 6 illustrates an exemplary experiment of torque ratio with respect to the related art, when X4/B is modified from 0.009 to 0.053 while X1/D is fixed to 0.021, X2/B is fixed to 0.090, and X3/B is fixed to 0.027, in the sample bearing of the axial cross-sectional view of FIG. 8. FIG. 10 is a graph resulting from Table 6.

TABLE 6

| | X4 (mm) | | | | |
|---|---|---|---|---|---|
| | 0.33 | 0.52 | 1.02 | 2.02 | |
| | | X4/B | | | Related |
| | 0.009 | 0.014 | 0.027 | 0.053 | art |
| Torque (N·m) | 0.90 | 0.86 | 0.86 | 0.86 | 1.30 |
| Torque ratio | 0.69 | 0.66 | 0.66 | 0.66 | 1.00 |

As shown in Table 6 and FIG. 10, the value of X4/B ranges from 0.009 to 0.053, and the torque ratio becomes 0.7 or less. Therefore, if the value of X4/B is set to the range from 0.009 to 0.053, torque can be sharply reduced by 30% or more, as compared to the related art, thus significantly reducing driving costs.

Figure 11:
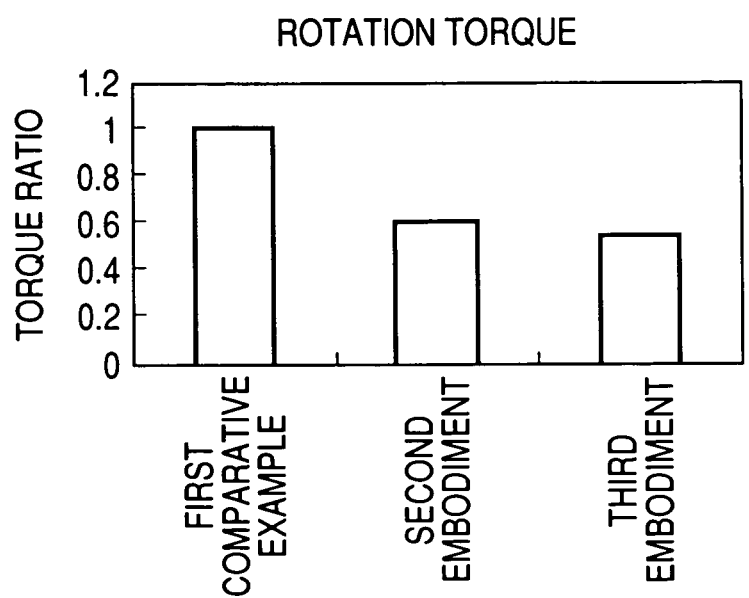
FIG. 11 is a view illustrating an exemplary experiment for torque ratio in a bearing of a first comparative example, a bearing of a second embodiment, and a bearing of a third embodiment, with respect to a bearing of the related art.
Figure 12:
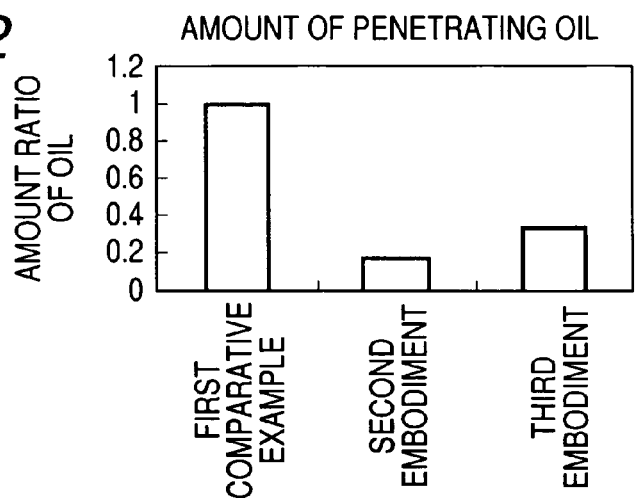
FIG. 12 is a view illustrating an exemplary experiment for the amount ratio of penetrating oil in the bearing of the first comparative example, the bearing of the second embodiment, and the bearing of the third embodiment, with respect to the bearing of the related art.
Figure 13:
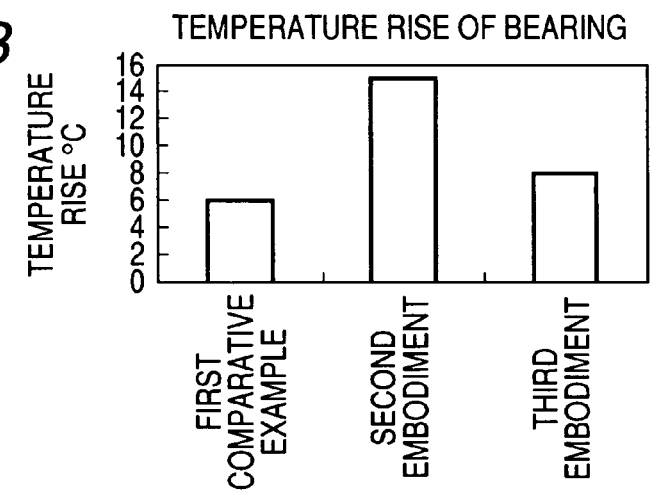
FIG. 13 is a view illustrating an exemplary experiment for temperature rise in the bearing of the first comparative example, the bearing of the second embodiment, and the bearing of the third embodiment.

Table 7 is a table illustrating the value of factors of a bearing of a first comparative example, a bearing of a second embodiment of the invention, and a bearing of a third embodiment of the invention, and illustrates an exemplary experiment of the torque ratio of the bearing having the factors with respect to the bearing according to the related art, an exemplary experiment of the amount ratio of oil of the bearing having the factors with respect to the bearing according to the related art, and an exemplary experiment of temperature rise of the bearing having the factors. FIG. 11 is a view illustrating an exemplary experiment for the torque ratio in the bearing 10 of the first comparative example, the bearing of the second embodiment, and the bearing of the third embodiment, with respect to the bearing of the related art. FIG. 12 is a view illustrating an exemplary experiment for the amount ratio of penetrating oil in the bearing of the first comparative example, the bearing of the second embodiment, and the bearing of the third embodiment, with respect to the bearing of the related art. FIG. 13 is a view illustrating an exemplary experiment of temperature rise in the bearing of the first comparative example, the bearing of the second embodiment, and the bearing of the third embodiment.

TABLE 7

| Specification | First comparative example | Second embodiment | Third embodiment |
|---|---|---|---|
| Bore diameter (mm) | 35 | 35 | 35 |
| Outside diameter (mm) | 89 | 89 | 89 |
| Width (longitudinal width) (mm) | 38 | 38 | 38 |
| α (°) | 22.5 | 22.5 | 25 |
| X1/D | 0.066 | 0.021 | 0.021 |
| X2/B | −0.061 | 0.045 | 0.090 |
| X3/D | N/A | 0.062 | 0.027 |
| X4/B | N/A | 0.034 | 0.014 |
| Torque ratio | 1 | 0.59 | 0.54 |
| Amount ratio of oil | 1 | 0.17 | 0.34 |
| Temperature rise (° C.) | 6 | 15 | 8 |

Here, the temperature rise means the difference between the temperature of the bearing and the temperature of supply oil. In addition, the experiment is conducted under conditions of an axial load of 4 kN, rotation speed of 3000 r/min, oil temperature of 50° C., and as for the amount of oil, a full amount of oil condition (similar to conditions for parameter experiment). In addition, the first comparative example is a product according to the related art. The bearing according to the second embodiment is a bearing in which a labyrinth structure is formed outside in the axis direction of the small rib portion of the inner ring of the bearing according to the first comparative example. The bearing according to the third embodiment is advanced in a pumping function by forming the labyrinth structure outside in the axis direction of the small rib portion of the inner ring, setting the angle of the outer ring raceway to 25° that is steeper than that of the related art so as to draw oil into the bearing and discharge the oil from the bearing.

As shown in FIG. 11, the value of torque ratio is set to 0.6 or less in both the bearing according to the second embodiment, and the bearing according to the third embodiment, torque of the bearing according to the second and third embodiment can be reduced by 40% or more of torque of the bearing according to the related art. In addition, as shown in FIG. 12, the amount ratio of penetrating oil is 0.2 or less in the second embodiment, which is very small as compared to the related art. Meanwhile, the amount ratio of penetrating oil is 0.34, which means the amount of oil penetrating the bearing is larger than that of the second embodiment. In relation to this, as shown in FIG. 13, while temperature rise in the second embodiment is two times the temperature rise in the first comparative example, temperature rise in the third embodiment is 1.3 times the temperature rise in the first comparative example, which eliminates worries about seizure. In this respect, if the angle of the outer ring raceway is set to about 25° which is steeper than that of the related art, preferably, it is possible to reliably prevent seizure.

Figure 14:
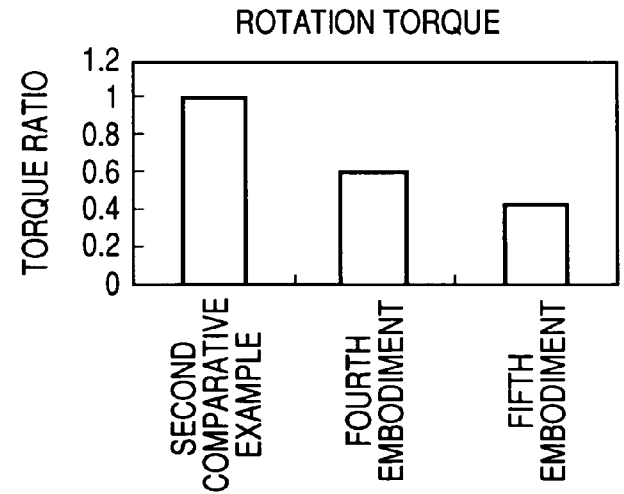
FIG. 14 is a view illustrating an exemplary experiment for torque ratio in a bearing of a second comparative example, a bearing of a fourth embodiment, and a bearing of a fifth embodiment, with respect to a bearing of the related art.
Figure 15:
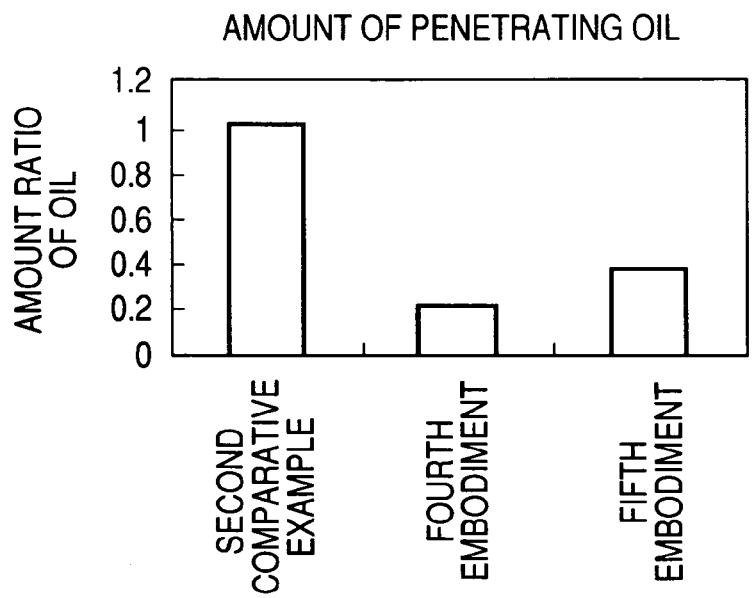
FIG. 15 is a view illustrating an exemplary experiment for the amount ratio of penetrating oil in the bearing of the second comparative example, the bearing of the fourth embodiment, and the bearing of the fifth embodiment, with respect to the bearing of the related art.
Figure 16:
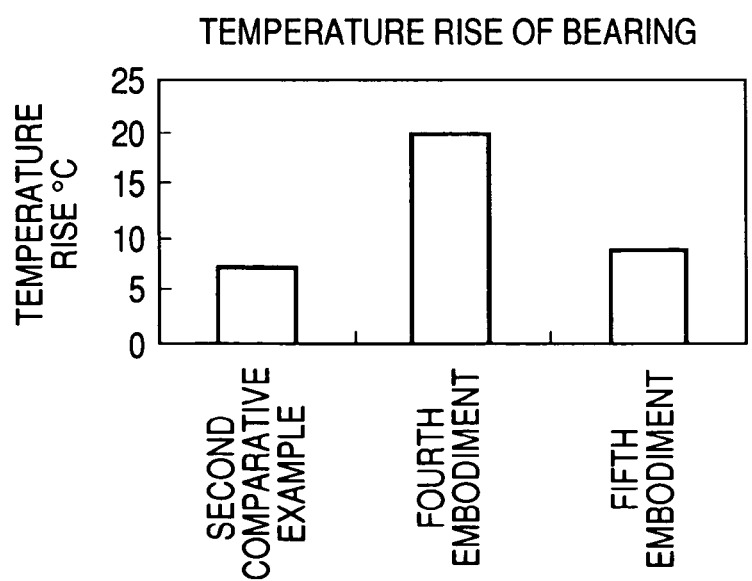
FIG. 16 is a view illustrating an exemplary experiment for temperature rise in the bearing of the second comparative example, the bearing of the fourth embodiment, and the bearing of the fifth embodiment.

Table 8 is a table illustrating the value of factors of a bearing of a second comparative example, a bearing of a fourth embodiment of the invention, and a bearing of a fifth embodiment of the invention, and illustrates an exemplary experiment of the torque ratio of the bearing having the factors with respect to the bearing according to the related art, an exemplary experiment of the amount ratio of oil of the bearing having the factors with respect to the bearing according to the related art, and an exemplary experiment of temperature rise of the bearing having the factors. FIG. 14 is a view illustrating an exemplary experiment for the torque ratio in the bearing of the second comparative example, the bearing of the fourth embodiment, and the bearing of the fifth embodiment, with respect to the bearing of the related art. FIG. 15 is a view illustrating an exemplary experiment of the amount ratio of penetrating oil in the bearing of the second comparative example, the bearing of the fourth embodiment, and the bearing of the fifth embodiment, with respect to the bearing of the related art. FIG. 16 is a view illustrating an exemplary experiment of temperature rise in the bearing of the second comparative example, the bearing of the fourth embodiment, and the bearing of the fifth embodiment.

TABLE 8

| Specification | First comparative example | Second embodiment | Third embodiment |
|---|---|---|---|
| Bore diameter (mm) | 34.9 | 34.9 | 34.9 |
| Outside diameter (mm) | 72.2 | 72.2 | 72.2 |
| Width (longitudinal width) (mm) | 25.4 | 25.4 | 20.5 |
| α (°) | 20 | 20 | 28.8 |
| X1/D | 0.029 | 0.023 | 0.023 |
| X2/B | −0.069 | 0.102 | 0.111 |
| X3/D | N/A | 0.006 | 0.003 |
| X4/B | N/A | 0.030 | 0.017 |
| Torque ratio | 1 | 0.58 | 0.42 |
| Amount ratio of oil | 1 | 0.22 | 0.38 |
| Temperature rise (° C.) | 7 | 20 | 9 |

Here, the temperature rise means the difference between the temperature of the bearing and the temperature of supply oil. In addition, the experiment is conducted under conditions of an axial load of 4 kN, rotation speed of 3000 r/min, oil temperature of 50° C., and as for the amount of oil, a full amount of oil condition (similar to conditions for parameter experiment). In addition, the second comparative example is a product according to the related art. The bearing according to the fourth embodiment is a bearing in which a labyrinth structure is formed outside in the axis direction of the small rib portion of the inner ring of the bearing according to the second comparative example. The bearing according to the fifth embodiment is more advanced than that of the fourth embodiment in a pumping function by forming the labyrinth structure outside in the axis direction of the small rib portion of the inner ring, setting the angle of the outer ring raceway to be steeper than that of the fourth embodiment so as to draw oil into the bearing and discharge the oil from the bearing.

As shown in FIG. 14, in the bearing according to the fourth embodiment, torque is reduced by 40% or more of the torque of the related art, and in the bearing according the fifth embodiment, torque is sharply reduced by 50% of the torque of the related art.

In addition, as shown in FIGS. 15 and 16, in the bearing according to the fourth embodiment, the amount of penetrating oil is as extremely small as 20% or less of the amount of the related art, thus, temperature increase is as large as three times that of the related art. In the meantime, in the bearing according to the fifth embodiment, the amount of penetrating oil is 38% of the amount of the related art, and temperature rise is smaller than that of the fourth embodiment, such that the temperature rise becomes about 13 times that of the second comparative example. Therefore, in the fifth embodiment, it is possible to reliably prevent seizure. According to the result of experiment, if the angle of the outer ring raceway is 30° or less, the amount of penetrating oil increases, and vibration which can cause problems to a rotation shaft supported in the bearing is not generated. However, if the angle of the outer ring raceway exceeds 30°, it is impossible to reliably support a radial load, thus generating vibration which can excessively cause problems to the rotation shaft supported in the bearing.

According to the tapered roller bearing device of the first embodiment, X2/B is 0.010 or more, and the inequality $0.009 \leq X1/D \leq 0.043$ is satisfied, so that torque in the tapered roller bearing device during driving can be significantly reduced. Therefore, it is possible to improve fuel efficiency of a vehicle or the like having the tapered roller bearing device according to the invention.

In addition, according to the tapered roller bearing device of the first embodiment, because inequalities $0.010 \leq X2/B \leq 0.161$, $0.006 \leq X3/D \leq 0.043$, and $0.009 \leq X4/B \leq 0.053$ are satisfied, it is possible to reduce torque and prevent seizure, as compared to the related art.

In addition, according to the tapered roller bearing device of the first embodiment, in the section including the central axis of the outer ring 2, since the angle at which the tapered raceway surface 10 of the outer ring 2 crosses the central axis is set to the range of 25 to 30°, the pump function in drawing in oil and discharging the oil is improved, and torque can be significantly reduced, and the amount of penetrating oil can be increased, thus reliably preventing seizure from occurring in the bearing.

In addition, according to the tapered roller bearing device of the first embodiment, $z \cdot DW/(\Pi \cdot dm)$ is set to the range of 0.7 to 0.92, the ratio of volume occupied by tapered rollers in the bearing device can be decreased as compared to the related art, the amount of penetrating oil can be increased, and agitation loss can be reduced. Therefore, it is preferable in that seizure is prevented and rotation torque is reduced.

In addition, the inequalities $0.010 \leq X2/B \leq 0.161$, $0.006 \leq X3/D \leq 0.043$, and $0.009 \leq X4/B \leq 0.053$ are satisfied in the tapered roller bearing of the first embodiment, but the above-described objects can be obtained as long as X2/B is 0.010 or more, or the inequality $0.009 \leq X1/D \leq 0.043$ is satisfied. In other words, X2/B need not be $X2/B \leq 0.161$, X3/D need not be $0.006 \leq X3/D \leq 0.043$, and X4/B need not be $0.009 \leq X4/B \leq 0.053$. In addition, the angle of the outer ring raceway need not be in the range of 25 to 30°, and $z \cdot DW/(\Pi \cdot dm)$ need not be set to the range of 0.7 to 0.92.

In addition, in the tapered roller bearing according to the first embodiment, the small rib portion 8 and the cylindrical portion 9 of the inner ring 1 may be made separate to each other. Specifically, the small-diameter end portion (the small rib portion 8 and the cylindrical portion 9) of the inner ring shown by P1 in FIG. 2 is formed of the ring shaped member and is formed integrally with a main body including the large-diameter end portion of the inner ring formed of the ring-shaped member shown by P0 in FIG. 2. However, the small-diameter end portion P1 and the main body P0 of the inner ring may be formed separately, and the small-diameter end portion P1 may contact the main body P0 in the axial direction. Further, only the small-diameter end portion of the inner ring shown by P2 (a portion axially outside of the small rib portion) may be formed of a separate ring-shaped member, and the small diameter end portion P2 of the inner ring may contact the ring-shaped member in which the small-diameter portion 8 and the main body of the inner ring are integrally formed.

In additions according to the embodiment, a liquid lubricating roller bearing device in which the liquid flowing between the outer ring and the inner ring is oil has been described, but the liquid flowing inside the liquid lubricating roller bearing device is not limited to oil. For example, the fluid may be a cleaning fluid, etc, other than oil.

In addition, according to the embodiment, although the inner ring has the small rib portion at the small-diameter end of the inner ring, the inner ring need does not need the small rib portion at the small diameter end portion of the inner ring in the invention. For example, the bearing may be structured so that the inner ring does not have the small rib portion at the smaller diameter end portion of the inner ring, and the tapered roller is positioned in the axial direction by a large rib portion formed at the small diameter end portion (the small diameter side of the tapered raceway surface) of the outer ring and a rib formed at the larger diameter end portion (the large diameter side of the tapered raceway surface) of the inner ring.

What is claimed is:

1. A liquid lubricating tapered roller bearing device comprising:
   an outer ring;
   an inner ring;
   tapered rollers disposed between the outer and inner rings;
   a cage that holds the tapered rollers;
   wherein the inner ring includes a raceway surface on which the tapered rollers are disposed, and a small-diameter end portion and a large-diameter end portion which are formed at opposite ends of the raceway surface,
   wherein the small-diameter end portion of the inner ring includes a small rib portion including an outside diameter larger than an outside diameter of an axial outer end surface of the small-diameter end portion of the inner ring,
   wherein the cage includes a large-diameter end portion located corresponding to the large-diameter end portion of the inner ring and a small-diameter end portion located corresponding to the small-diameter end portion of the inner ring,
   wherein the small-diameter end portion of the cage includes a bending portion facing an outer periphery of the small-diameter end portion of the inner ring with a clearance,
   wherein an inner periphery of the bending portion is located further inside in a diameter direction than an outer periphery of the small rib portion,
   wherein an axial outer end surface of the bending portion is located further inside in the axial direction than the axial outer end surface of the small-diameter end portion of the inner ring,
   wherein the axial outer end surface of the bending portion is located further outside in the axial direction than the small rib portion of the small-diameter end portion of the inner ring,
   wherein liquid lubricates between the inner ring and the outer ring, and
   wherein inequalities $X2/B \geq 0.010$ and $0.009 \leq X1/D \leq 0.043$ are satisfied where:
   B represents a width in the axial direction of the inner ring;
   D represents a bore diameter of the inner ring;
   X2 represents a distance in the axial direction from the axial outer end surface of the inner ring to the axial outer end surface of the bending portion; and X1 represents a dimension of a clearance in the diameter direction between the bending portion and the small-diameter end portion of the inner ring.

2. The liquid lubricating tapered roller bearing device according to claim 1, wherein
the small-diameter end portion of the inner ring includes the small rib portion and a cylindrical portion,
the outside diameter of the small rib portion is larger than an outside diameter of the cylindrical portion,
inequalities $0.010 \leq X2/B \leq 0.161$, $0.006 \leq X3/D \leq 0.043$, or $0.009 \leq X4/B \leq 0.053$ are satisfied where:
X3 represents a distance in the diameter direction from an outer periphery of the small rib portion to the inner periphery of the bending portion; and
X4 represents a dimension of a clearance between an axial outer end surface of the small rib portion and an axial inner end surface of the bending portion.

3. The liquid lubricating tapered roller bearing device according to claim 2, wherein the large-diameter end portion of the inner ring includes a large rib portion.

4. The liquid lubricating tapered roller bearing device according to claim 1, wherein in a section including a central axis of the outer ring, an angle at which a tapered raceway surface of the outer ring crosses the central axis is set to the range of 25 to 30°.

5. The liquid lubricating tapered roller bearing device according to claim 1, wherein the clearance comprises a space disposed between an end of the bending portion and the small-diameter end portion of the inner ring.

6. The liquid lubricating tapered roller bearing device according to claim 1, wherein equation $X1=(D1-H1)/2$,
wherein D1 represents a bore diameter of the bending portion and H1 represents an outside diameter of a cylindrical portion of the inner ring.

7. The liquid lubricating tapered roller bearing device according to claim 1, wherein a filling rate of the tapered roller is in a range of 0.7 to 0.92.

8. A differential gear device comprising:
a liquid lubricating tapered roller bearing device comprising:
an outer ring;
an inner ring;
tapered rollers disposed between the outer and inner rings;
a cage that holds the tapered rollers;
wherein the inner ring includes a raceway surface on which the tapered rollers are disposed, and a small-diameter end portion and a large-diameter end portion which are formed at opposite ends of the raceway surface,
wherein the small-diameter end portion of the inner ring includes a small rib portion including an outside diameter larger than an outside diameter of an axial outer end surface of the small-diameter end portion of the inner ring,
wherein the cage includes a large-diameter end portion located corresponding to the large-diameter end portion of the inner ring and a small-diameter end portion located corresponding to the small-diameter end portion of the inner ring,
wherein the small-diameter end portion of the cage includes a bending portion facing an outer periphery of the small-diameter end portion of the inner ring with a clearance,
wherein an inner periphery of the bending portion is located further inside in a diameter direction than an outer periphery of the small rib portion,
wherein an axial outer end surface of the bending portion is located further inside in the axial direction than the axial outer end surface of the small-diameter end portion of the inner ring,
wherein the axial outer end surface of the bending portion is located further outside in the axial direction than the small rib portion of the small-diameter end portion of the inner ring,
wherein liquid lubricates between the inner ring and the outer ring, and
wherein inequalities $X2/B \geq 0.010$ and $0.009 \leq X1/D \leq 0.043$ are satisfied where:
B represents a width in the axial direction of the inner ring;
D represents a bore diameter of the inner ring;
X2 represents a distance in the axial direction from the axial outer end surface of the inner ring to the axial outer end surface of the bending portion; and
X1 represents a dimension of a clearance in a diameter direction between the bending portion and the small-diameter end portion of the inner ring.

9. The differential gear device according to claim 8, wherein
the small-diameter end portion of the inner ring includes the small rib portion and a cylindrical portion,
the outside diameter of the small rib portion is larger than an outside diameter of the cylindrical portion,
inequalities $0.010 \leq X2/B \leq 0.161$, $0.006 \leq X3/D \leq 0.043$, or $0.009 \leq X4/B \leq 0.053$ are satisfied where:
X3 represents a distance in the diameter direction from an outer periphery of the small rib portion to the inner periphery of the bending portion; and
X4 represents a dimension of a clearance between an axial outer end surface of the small rib portion and an axial inner end surface of the bending portion.

10. The differential gear device according to claim 8, wherein in a section including a central axis of the outer ring, an angle at which a tapered raceway surface of the outer ring crosses the central axis is set to the range of 25 to 30°.

11. The differential gear device according to claim 8, wherein the clearance comprises a space disposed between an end of the bending portion and the small-diameter end portion of the inner ring.

12. The differential gear device according to claim 9, wherein the large-diameter end portion of the inner ring includes a large rib portion.

13. The differential gear device according to claim 8, wherein equation $X1=(D1-H1)/2$,
wherein D1 represents a bore diameter of the bending portion and H1 represents an outside diameter of a cylindrical portion of the inner ring.

14. The differential gear device according to claim 8, wherein a filling rate of the tapered roller is in a range of 0.7 to 0.92.

15. A liquid lubricating tapered roller bearing device comprising:
an inner ring;
a tapered roller disposed on the inner ring;
a cage that holds the tapered roller;
wherein the inner ring includes a small-diameter end portion,
wherein the small-diameter end portion of the inner ring includes a small rib portion including an outside diameter larger than an outside diameter of an axial outer end surface of the small-diameter end portion of the inner ring, wherein the cage includes a bending portion facing the small-diameter end portion of the inner ring with a clearance disposed between the bending portion and the inner ring, wherein an inner periphery of the bending portion is located further inside in a diameter direction than an outer periphery of the small rib portion, wherein an axial outer end surface of the bending portion is located further outside in an axial direction than the small rib portion of the small-diameter end portion of the inner ring, and wherein inequalities $X2/B \geq 0.010$ and $0.009 \leq X1/D \leq 0.043$ are satisfied where:

B represents a width in an axial direction of the inner ring;
D represents a bore diameter of the inner ring;
X2 represents a distance in the axial direction from an axial outer end surface of the inner ring to an axial outer end surface of the bending portion; and
X1 represents a dimension of the clearance in a diameter direction between the bending portion and the small-diameter end portion of the inner ring.

16. The liquid lubricating tapered roller bearing device according to claim 15, wherein
the small-diameter end portion of the inner ring includes a small rib portion and the cylindrical portion,
the outside diameter of the small rib portion is larger than an outside diameter of the cylindrical portion,
inequalities $0.010 \leq X2/B \leq 0.161$, $0.006 \leq X3/D \leq 0.043$, or $0.009 \leq X4/B \leq 0.053$ are satisfied where:
X3 represents a distance in the diameter direction from an outer periphery of the small rib portion to the inner periphery of the bending portion; and
X4 represents a dimension of a clearance between an axial outer end surface of the small rib portion and an axial inner end surface of the bending portion.

17. The liquid lubricating tapered roller bearing device according to claim 15, further comprising an outer ring,
wherein in a section including a central axis of the outer ring, an angle at which a tapered raceway surface of the outer ring crosses the central axis is set to the range of 25 to 30°.

* * * * *